(12) United States Patent  
Bushnell, III

(10) Patent No.: US 7,885,530 B1  
(45) Date of Patent: Feb. 8, 2011

(54) MANUAL FOCUS DRIVING RING

(75) Inventor: Irving Edward Bushnell, III, Rockledge, FL (US)

(73) Assignee: Irving E. Bushnell, III, Rockledge, FL (US)

( * ) Notice: Subject to any disclaimer, the term of this patent is extended or adjusted under 35 U.S.C. 154(b) by 13 days.

(21) Appl. No.: 12/460,541

(22) Filed: Jul. 21, 2009

Related U.S. Application Data

(60) Provisional application No. 61/082,868, filed on Jul. 23, 2008.

(51) Int. Cl.  
*G02B 7/04* (2006.01)

(52) U.S. Cl. ...................................... 396/144; 359/825

(58) Field of Classification Search ................. 396/144; 348/345; 359/822, 823, 825

See application file for complete search history.

(56) References Cited

U.S. PATENT DOCUMENTS 7,248,422 B2 * 7/2007 Nishimoto .................. 359/822  
2009/0279192 A1 * 11/2009 Harada et al. ............... 359/825

* cited by examiner

*Primary Examiner*—W. B. Perkey  
*Assistant Examiner*—Autumn Parker

(57) ABSTRACT

One embodiment of a manual focus driving ring comprised of two base rings (10 and 11), each having a through-hole near their edge (20 and 21), roll pins (17) conjoining the base rings, a pressure mount ring (16) adhered to the inner surface of the base rings, or a threaded mount ring (24), either of which frictionally secures the manual focus driving ring to the camcorder body (25). A sliding ring (12) is sandwiched between the base rings and slides along their outer surface of the base rings. An extension rod (13) with a gear (14) or friction-driven o-ring (23) is inserted into the through-hole in the base rings, and is rotationally driven by the sliding ring's inner surface, and a flanged tube (15) on the outer tip of the extension rod that acts as a focus driver and rotates in conjunction with the rotation of the sliding ring.

12 Claims, 5 Drawing Sheets

MANUAL FOCUS DRIVING RING

CROSS-REFERENCE TO RELATED APPLICATIONS

This application claims the benefit of provisional patent application Ser. No. 61/082,868, filed 2008, Jul. 23 by the present inventor.

FEDERALLY SPONSORED RESEARCH

Not applicable

SEQUENCE LISTING OR PROGRAM

Not applicable

BACKGROUND OF THE INVENTION

1. Field

This application generally relates to hand-held camcorders, specifically to hand-held camcorders made with a side-mounted manual focus wheel.

2. Prior Art

Presently, several models of hand-held camcorders are made with a small manual focus wheel mounted on the side of the camcorder. A user manually focuses the camcorder by rotating the focus wheel with the tip of his or her finger(s). There are several disadvantages to this small focus wheel:
  a) The small size and placement of the focus wheel is awkward for the user, and can only be manipulated using the tip of the finger or fingers.
  b) The small size of the focus wheel only allows for a limited amount of rotation, thereby only permitting users to manually focus in small, erratic increments.
  c) The limited amount of rotation allowed by the small focus wheel makes it impossible for the user to manually create a long, smooth, focal transition. Instead the user can only manually create short, rough, focal transitions.

BRIEF SUMMARY OF THE INVENTION

In accordance with one embodiment, a manual focus driving ring is comprised of two circular base rings, each having a through-hole near their edge, roll pins that conjoin the base rings, a pressure mount ring adhered to the inner surface of the base rings, a textured sliding ring that is sandwiched between the two base rings and slides along the outer surface of the base rings, an extension rod with a gear that is inserted into the through-hole in the base rings and is rotationally driven by the inner surface of the sliding ring, and a flanged tube on the outer tip of the extension rod that rotates in conjunction with the rotation of the sliding ring.

To solve the above-mentioned disadvantages, it is an object of the present embodiment to provide an enlarged and superior manual focus driving ring that can be easily mounted onto any camcorder supplied with a side-mounted manual focus wheel. As the user rotationally manipulates the sliding ring, the extension rod and flanged tube rotate in conjunction, causing friction against the camcorder's manual focus wheel, thereby affording the user greater control over the rotation of the focus wheel, thus allowing for smoother and longer manual focal transitions.

DRAWINGS-REFERENCE NUMERALS

Figure 1A:
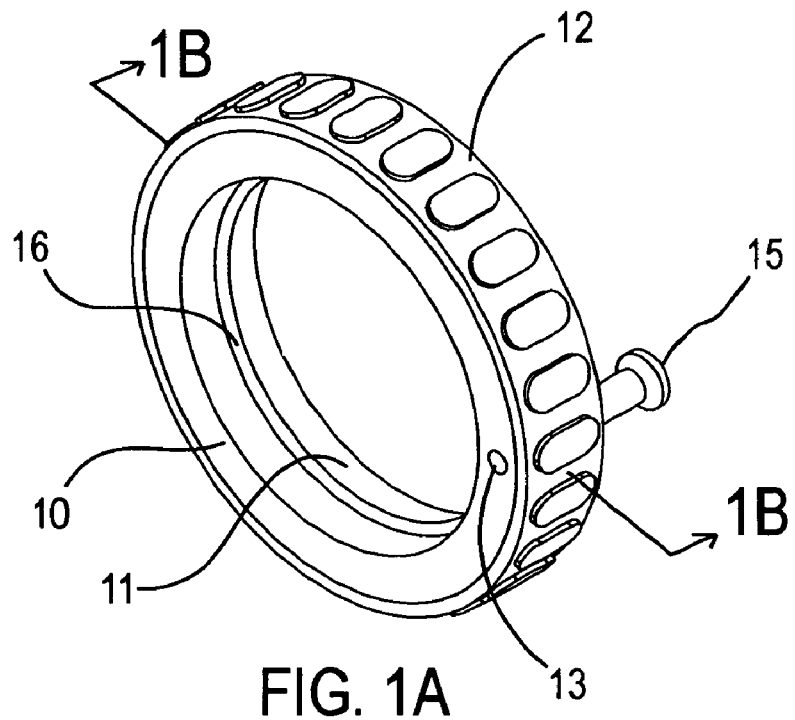
FIG. 1A shows a perspective view of a manual focus driving ring.

10 Front base ring
11 Back base ring
12 Sliding ring with internal gear
13 Extension rod
14 Gear
15 Flanged tube
16 Pressure mount ring
17 Roll pin
18 Front Indentation
19 Back Indentation
20 Front through-hole
21 Back through-hole
22 Sliding ring with smooth internal surface
23 Friction-driven O-ring
24 Threaded mount ring
25 Camcorder body
26 Camcorder focus wheel
27 Camcorder lens barrel
28 Camcorder lens barrel internal threading

DETAILED DESCRIPTION OF THE INVENTION

Before explaining the present embodiment in detail, it is important to understand that the embodiment is not limited in its application to the details of the construction illustrated and the steps described herein. Other embodiments may exist and may be practiced or carried out in a variety of ways, including a combination of the embodiments described. It is to be understood that the phraseology and terminology employed herein is for the purpose of description and not of limitation.

Figure 1B:
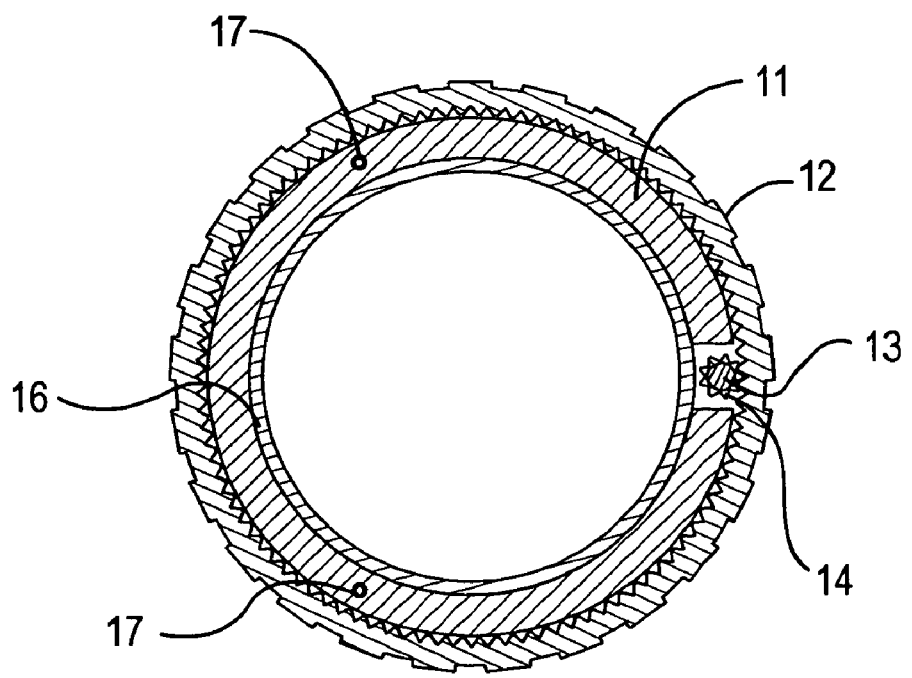
FIG. 1B shows a sectional view of a manual focus driving ring.
Figure 2:
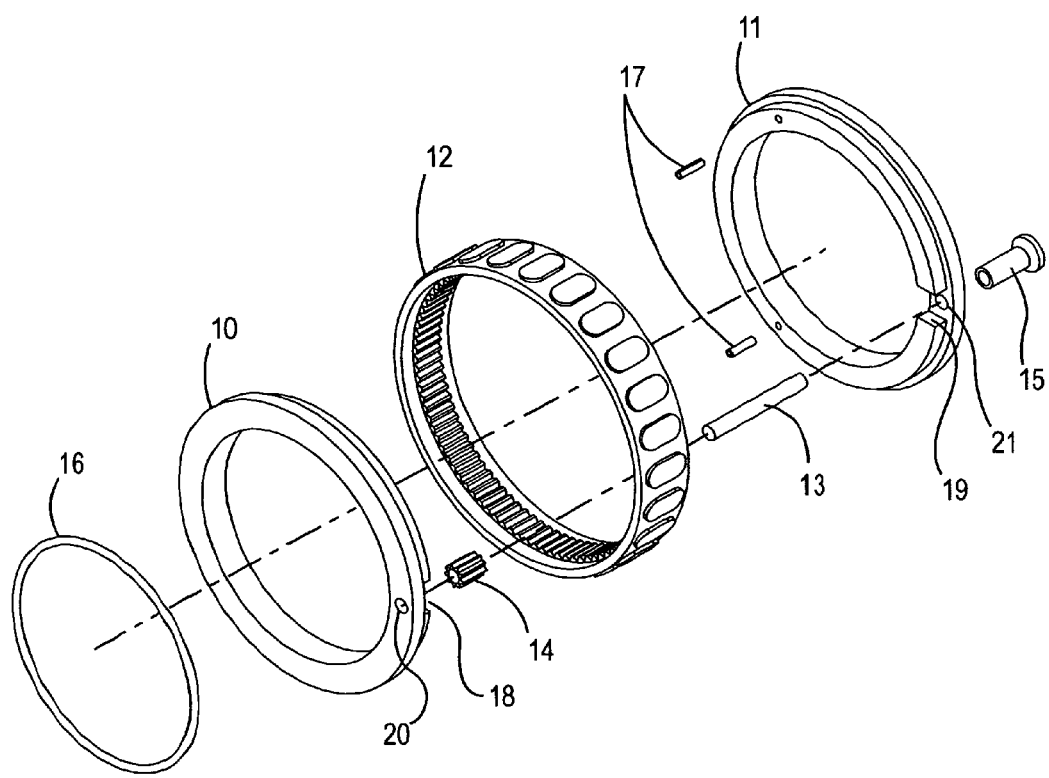
FIG. 2 shows an exploded view of a manual focus driving ring supplied with a gear, a sliding ring with an internal gear, and a pressure mount ring in accordance with one embodiment.
Figure 3A:
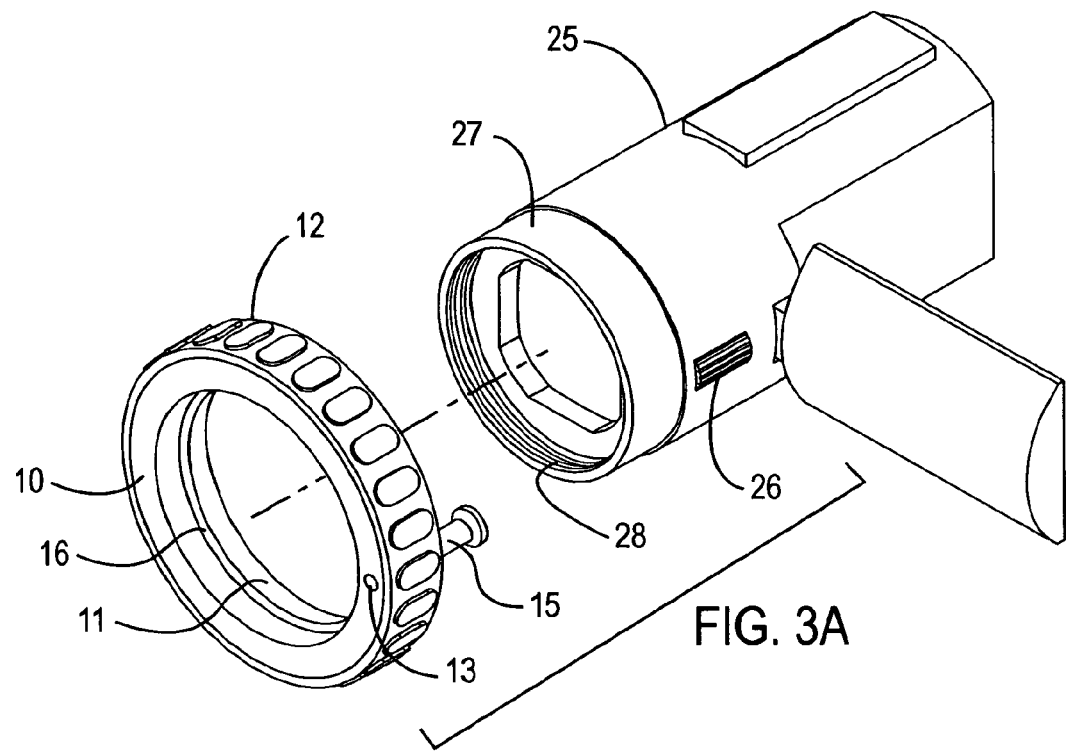
FIG. 3A shows an exploded view of one embodiment of a manual focus driving ring as it relates to a camcorder.
Figure 3B:
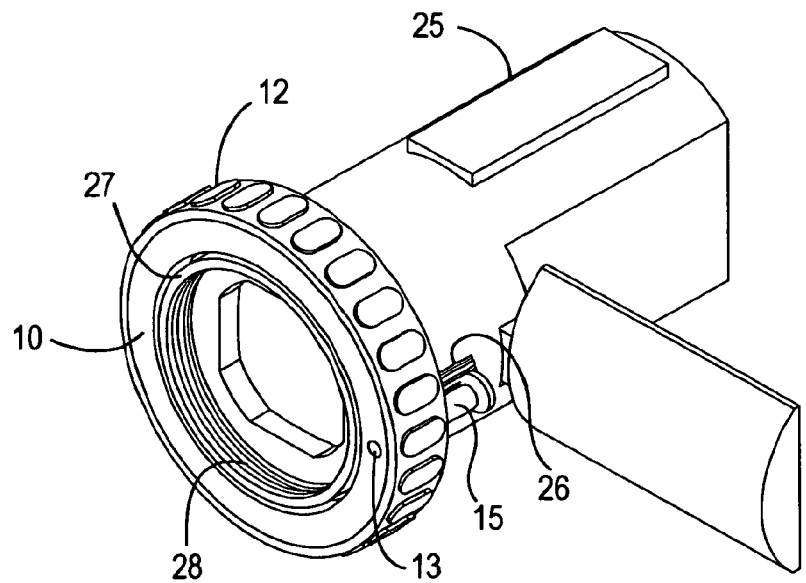
FIG. 3B shows a perspective view of one embodiment of a manual focus driving ring mounted on a camcorder.
Figure 4:
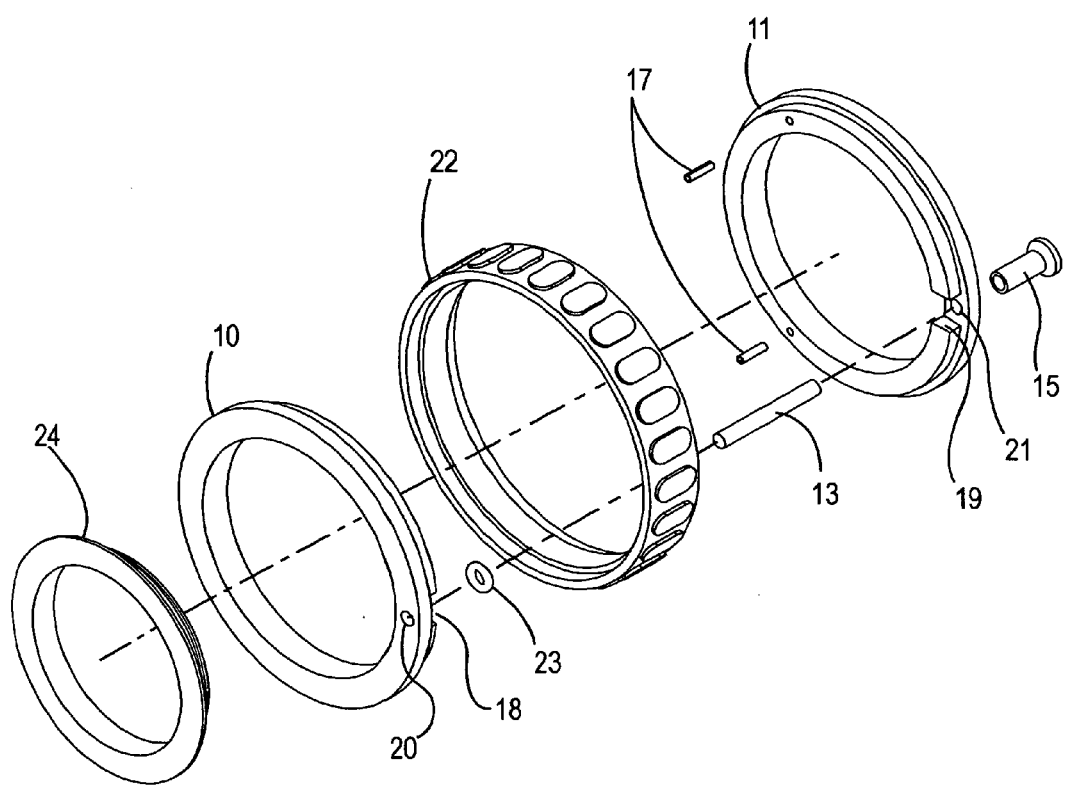
FIG. 4 shows an exploded view of a manual focus driving ring supplied with a friction-driven o-ring, a sliding ring with a smooth internal surface, and a threaded mount ring in accordance with an alternative embodiment.

The first embodiment of the manual focus driving ring is illustrated in FIG. 1A (perspective view) and FIG. 1B (sectional view), as well as FIG. 2 (exploded view). FIG. 3A illustrates the manual focus driving ring as it relates to a camcorder (exploded view). FIG. 3B illustrates the manual focus driving ring mounted on a camcorder (perspective view). An alternative embodiment of the manual focus driving ring is illustrated in FIG. 4 (exploded view), and in FIG. 5A (exploded view), which illustrates the manual focus driving ring as it relates to a camcorder, as well as in FIG. 5B (perspective view), which illustrates the manual focus driving ring mounted on a camcorder.

As shown in FIG. 1A, the manual focus driving ring has a front base ring 10 consisting of a rigid material, a back base ring 11 also consisting of a rigid material, and a textured sliding ring with internal gear (termed gear sliding ring) 12 consisting of a rigid material and being sandwiched between front base ring 10 and back base ring 11. The outer texture of gear sliding ring 12 provides grip for the user. In the present embodiment, base rings 10 and 11 and gear sliding ring 12 are made of anodized aluminum with a PTFE hard coat and are turned on a lathe. However, base rings 10 and 11 and gear sliding ring 12 can consist of any other rigid material such as steel, brass, polycarbonate plastic, ABS plastic, Acetal plastic, etc. As shown in FIG. 2, front base ring 10 has a front indentation 18 and a front through-hole 20. Back base ring 11 has a back indentation 19, and a back through-hole 21. The indentations and holes are cut on a vertical mill.

On the inner surface of front base ring 10 and back base ring 11 is a pressure mount ring 16, shown clearly in FIG. 1A. In the present embodiment, mount ring 16 is made of neoprene; however, mount ring 16 can also consist of any other rubber such as silicone, latex, urethane, etc. Mount ring 16 adheres to the inner surface of front base ring 10 and back base ring 11 by virtue of fast acting glue. Holding together front base ring 10 and back base ring 11 are multiple roll pins 17, as shown in FIG. 2, consisting of steel. Inserted through front base ring 10 and back base ring 11 is an extension rod 13. In the present embodiment, extension rod 13 consists of metal; however, it can also consist of any other rigid material such as plastic.

Surrounding a portion of extension rod 13 is a gear 14, clearly illustrated in FIG. 2. Gear 14 consists of metal in the current embodiment. However, it can also consist of any other rigid material such as plastic. Gear 14 is placed between front and back indentations 18 and 19 respectively, of front base ring 10 and back base ring 11. Extension rod 13 is then inserted through front and back through-holes 20 and 21 respectively, and through gear 14. On the outer, portion of extension rod 13 is a flanged tube 15. In the present embodiment, flanged tube 15 is made of rubber using a mold. Flanged tube 15 can be made of several rubbers such as silicone, latex, urethane, etc.

FIG. 3A shows the first embodiment as it relates to a camcorder body 25. Mount ring 16 frictionally secures the manual focus driving ring to a camcorder lens barrel 27 on camcorder body 25, as illustrated in FIG. 3B. Flanged tube 15 provides friction against a camcorder focus wheel 26.

Operation

First Embodiment

The manner of using the first embodiment of the manual focus driving ring is as follows. The manual focus driving ring is mounted onto camcorder lens barrel 27 of camcorder body 25, which has side-mounted camcorder focus wheel 26, as depicted in FIG. 3B. Pressure mount ring 16 is sized to a specification such that it frictionally secures the manual focus driving ring onto camcorder lens barrel 27 of camcorder body 25. Pressure mount ring 16 makes it easy for the user to both mount and remove the manual focus driving ring from camcorder lens barrel 27 of camcorder body 25. With the manual focus driving ring mounted onto camcorder lens barrel 27, extension rod 13 and flanged tube 15 are sized to a specification such that they reach side-mounted camcorder focus wheel 26 of camcorder body 25. Flanged tube 15 is contiguous to camcorder focus wheel 26, providing friction and acting as a focus driver. As the user rotationally manipulates gear sliding ring 12, the inner surface of gear sliding ring 12 rotationally drives gear 14, clearly shown in FIG. 2, which conjointly rotationally drives extension rod 13 and flanged tube 15. Flanged tube 15, rotating against camcorder focus wheel 26, acts as a focus driver, causing camcorder focus wheel 26 to also rotate, in conjunction with the rotation of gear sliding ring 12. As the user rotates gear sliding ring 12, camcorder focus wheel 26 rotates in conjunction, thereby manually focusing the camcorder. Because of the enlarged size of the manual focus driving ring in comparison to camcorder focus wheel 26, the amount of rotation possible is significantly increased. The manual focus driving ring's function is to frictionally rotate camcorder focus wheel 26.

Advantages

From the description above, a number of advantages of the present embodiments of the manual focus driving ring become evident:

a) The placement of the manual focus driving ring at the front end of camcorder body 25, around camcorder lens barrel 27, makes it more practical and convenient to use than camcorder focus wheel 26.

b) The enlarged size of the manual focus driving ring in comparison to camcorder focus wheel 26 allows for significantly more rotation.

c) The increase of rotation provided by the enlarged size of the manual focus driving ring affords the user more manual control, thus allowing the user to create a significantly improved manual focal transition. By manipulating gear sliding ring 12, the user can create long, smooth, manual focal transitions, whereas using only camcorder focus wheel 26, such transitions are impossible to achieve. With camcorder focus wheel 26 alone, focal transitions are short and somewhat erratic.

d) By manipulating gear sliding ring 12, the user can also control the speed of the manual focal transitions.

e) The manual focus driving ring can be easily mounted and removed from camcorder lens barrel 27.

Description

Alternative Embodiment

Figure 5A:
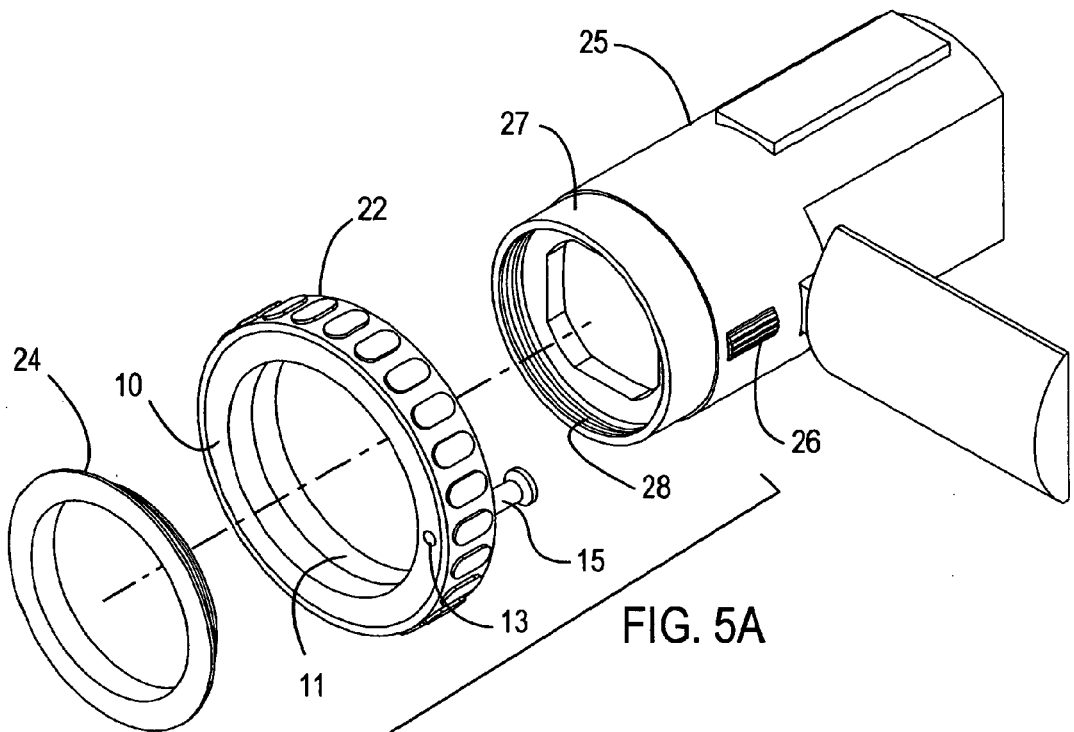
FIG. 5A shows an exploded view of an alternative embodiment of a manual focus driving ring as it relates to a camcorder.
Figure 5B:
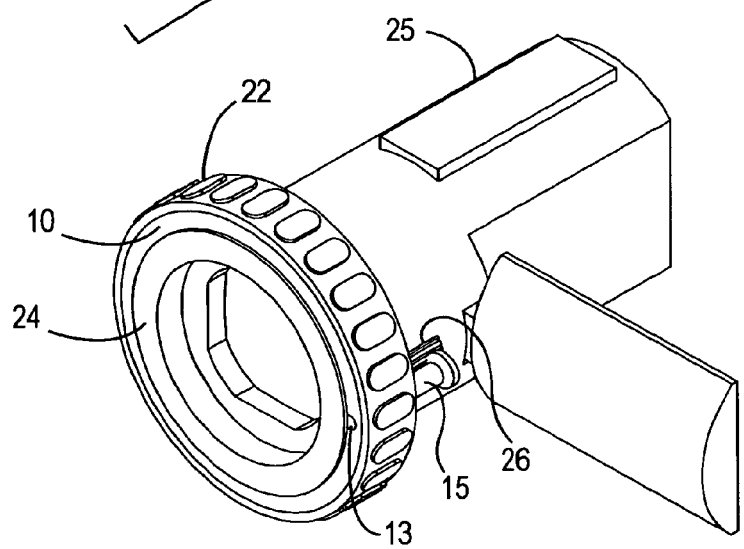
FIG. 5B shows a perspective view of an alternative embodiment of a manual focus driving ring mounted on a camcorder.

FIG. 4, FIG. 5A, and FIG. 5B illustrate an alternative embodiment of the manual focus driving ring. As shown in FIG. 4, the manual focus driving ring is comprised of front base ring 10, back base ring 11, and a textured sliding ring with a smooth internal surface (termed smooth sliding ring) 22, being sandwiched between front base ring 10 and back base ring 11. The outer texture of smooth sliding ring 22 provides grip for the user. As shown in FIG. 4, front base ring 10 has a front indentation 18 and a front through-hole 20. Back base ring 11 has a back indentation 19 and a back through-hole 21. Holding together front base ring 10 and back base ring 11 are multiple roll pins 17. Inserted through front base ring 10 and back base ring 11 is extension rod 13.

Surrounding a portion of extension rod 13 is a friction-driven o-ring 23, clearly illustrated in FIG. 4. Friction-driven o-ring 23 consists of rubber in the alternative embodiment. Friction driven o-ring 23 is placed between front and back indentations 18 and 19 respectively, of front base ring 10 and back base ring 11. Extension rod 13 is then inserted through front and back through-holes 20 and 21 respectively, and through friction-driven o-ring 23. Friction driven o-ring 23 provides pressure against the inner surface of smooth sliding ring 22. On the outer portion of extension rod 13 is flanged tube 15. Proximal to front base ring 10 is a threaded mount ring 24, shown clearly in FIG. 4.

FIG. 5A shows the alternative embodiment as it relates to camcorder body 25. Threaded mount ring 24 is placed contiguous to front base ring 10. Threaded mount ring 24 threads securely onto a camcorder lens barrel internal threading 28, such that the manual focus driving ring is secured to camcorder lens barrel 27 on camcorder body 25, as illustrated in FIG. 5B. Flanged tube 15 provides friction against camcorder focus wheel 26.

Operation

Alternative Embodiment

The manner of using the manual focus driving ring of the alternative embodiment is as follows. The manual focus driving ring is mounted onto camcorder lens barrel 27 of camcorder body 25, which has side-mounted camcorder focus wheel 26, as depicted in FIG. 5B. Threaded mount ring 24 is sized to a specification such that it threads securely onto camcorder lens barrel internal threading 28. Threaded mount ring 24 makes it easy for the user to both mount and remove the manual focus driving ring from camcorder lens barrel 27 of camcorder body 25. With the manual focus driving ring mounted onto camcorder lens barrel 27, extension rod 13 and flanged tube 15 are sized to a specification such that they reach side-mounted camcorder focus wheel 26 of camcorder body 25. Flanged tube 15 is contiguous to camcorder focus wheel 26, providing friction and acting as a focus driver. As the user rotationally manipulates smooth sliding ring 22, the inner surface of smooth sliding ring 22 rotationally drives the friction-driven o-ring 23, which conjointly rotationally drives extension rod 13 and flanged tube 15. Flanged tube 15, rotating against camcorder focus wheel 26, acts as a focus driver, thereby causing camcorder focus wheel 26 to also rotate, in conjunction with the rotation of smooth sliding ring 22. As the user rotates smooth sliding ring 22, camcorder focus wheel 26 rotates in conjunction, thereby manually focusing the camcorder. Because of the enlarged size of the manual focus driving ring in comparison to camcorder focus wheel 26, the amount of rotation possible will be significantly increased. The manual focus driving ring's function is to frictionally rotate camcorder focus wheel 26.

CONCLUSION, RAMIFICATIONS, AND SCOPE

Accordingly the reader will see that the manual focus driving ring of both embodiments is more conveniently placed on the camcorder for ease of use, increases the amount of rotation allowed by the camcorder focus wheel, thus affording the user more manual control of smoothness and speed, and significantly improves the quality of the camcorder's manual focal transitions. In addition, the manual focus driving ring can be easily mounted onto the camcorder lens barrel, as well as easily removed.

While the above description contains many specificities, these should not be construed as limitations on the scope of any embodiment, but as exemplifications of the presently preferred embodiments thereof. Many other ramifications and variations are possible within the teachings of the various embodiments. For example, the size of the manual focus driving ring can be altered to fit any camcorder lens barrel. The shape of the base rings can be altered in thickness or can be offset. The base rings and sliding ring of the manual focus driving ring can be comprised of several rigid materials such as any metal or any plastic or resin. The gear and roll pins can also be comprised of any metal or plastic. The gear can be substituted with an o-ring made of any rubber. The flanged tube and mount ring can also be made of any rubber. The flanged tube can be substituted with any frictional driving means. The pressure mounted ring can be substituted with a threaded mount ring that threads onto the inside of the lens barrel. The manual focus driving ring's design can also be used to control other camcorder functions such as aperture, exposure, etc, if these functions are controlled by the camcorder's side-mounted wheel.

Thus the scope of the invention should be determined by the appended claims and their legal equivalents, and not by the examples given.

I claim:

1. A manual focus driving device detachably mountable on a camcorder which includes a manual focus wheel located at the front side of said camcorder, said manual focus driving device comprising:
   a. a stationary circular front base ring having sufficient size to fit around a lens barrel of said camcorder and having a small through-hole proximal to the outer edge thereof, and having an indentation of predetermined size proximal to the small through-hole, and
   b. a stationary circular back base ring having sufficient size to fit around the lens barrel of said camcorder and having a small through-hole proximal to the outer edge thereof, and having an indentation of predetermined size proximal to the small through-hole, and
   c. a means for frictionally securing said manual focus driving device to said camcorder, being contiguous to said front base ring, and
   d. a rotational sliding means, being loosely sandwiched between said front base ring and said back base ring, such that said front base ring and said back base ring are parallel and conjoined, and being manually operable for rotation about the optical axis of said camcorder for operating said manual focus driving device, and
   e. an extension rod being perpendicularly positioned through said small through-hole in said front base ring and said back base ring, and having sufficient length to reach said manual focus wheel on said camcorder, and
   f. a means for rotating said extension rod being fixed around said extension rod, and being sandwiched between said front base ring and said back base ring, and being rotationally driven by inner surface of said rotational sliding means,
   g. a driving means surrounding the outer tip of said extension rod, having sufficient size to be contiguous to said manual focus wheel on said camcorder,
      whereby said driving means produces friction against said manual focus wheel on said camcorder, thus rotating said manual focus wheel in conjunction with the rotation of said rotational sliding means, thereby providing enhanced manual operation of said manual focus wheel.

2. The manual focus driving device of claim 1, wherein said front base ring is made of a rigid material.

3. The manual focus driving device of claim 1, wherein said back base ring is made of a rigid material.

4. The manual focus driving device of claim 1, wherein said means for frictionally securing said manual focus driving device to said camcorder is a pressure mount ring.

5. The manual focus driving device of claim 1, wherein said rotational sliding means is a textured sliding ring having an internal gear.

6. The manual focus driving device of claim 1, wherein said extension rod is made of a rigid material.

7. The manual focus driving device of claim 1, wherein said means for rotating said extension rod is a gear.

8. The manual focus driving device of claim 1, wherein said driving means surrounding the outer tip of said extension rod is a flanged tube.

9. A manual focus driving device detachably mountable on a camcorder which includes a manual focus wheel located at the front side of said camcorder, said manual focus driving device comprising:
   a. a stationary circular front base ring having sufficient size to fit around a lens barrel of said camcorder and having a small through-hole proximal to the outer edge thereof, and having an indentation of predetermined size proximal to the small through-hole, and
   b. a stationary circular back base ring having sufficient size to fit around the lens barrel of said camcorder and having a small through-hole proximal to the outer edge thereof, and having an indentation of predetermined size proximal to the small through-hole, and
   c. a means for frictionally securing said manual focus driving device to said camcorder, being contiguous to said front base ring, and
   d. a rotational sliding means, being loosely sandwiched between said front base ring and said back base ring, such that said front base ring and said back base ring are parallel and conjoined, and being manually operable for rotation about the optical axis of said camcorder for operating said manual focus driving device, and
   e. an extension rod being perpendicularly positioned through said small through-hole in said front base ring and said back base ring, and having sufficient length to reach said manual focus wheel on said camcorder, and
   f. a means for rotating said extension rod being fixed around said extension rod, and being sandwiched between said front base ring and said back base ring, and being rotationally driven by inner surface of said rotational sliding means,
   g. a driving means surrounding the outer tip of said extension rod, having sufficient size to be contiguous to said manual focus wheel on said camcorder,
   whereby said driving means produces friction against said manual focus wheel on said camcorder, thus rotating said manual focus wheel in conjunction with the rotation of said rotational sliding means, thereby providing enhanced manual operation of said manual focus wheel.

10. The manual focus driving device of claim 9, wherein said means for frictionally securing said manual focus driving device to said camcorder is a threaded mount ring.

11. The manual focus driving device of claim 9, wherein said rotational sliding means is a sliding ring with a smooth internal surface.

12. The manual focus driving device of claim 9, wherein said means for rotating said extension rod is a friction driven o-ring.

\* \* \* \* \*